US011461471B2

(12) United States Patent
Wang et al.

(10) Patent No.: US 11,461,471 B2
(45) Date of Patent: *Oct. 4, 2022

(54) VIRTUAL REALITY FOR SECURITY AUGMENTATION IN HOME AND OFFICE ENVIRONMENTS

(71) Applicant: AT&T Intellectual Property I, L.P., Atlanta, GA (US)

(72) Inventors: Wei Wang, Harrison, NJ (US); Cristina Serban, Middletown, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/175,273

(22) Filed: Feb. 12, 2021

(65) Prior Publication Data

US 2021/0165888 A1 Jun. 3, 2021

Related U.S. Application Data

(63) Continuation of application No. 15/989,462, filed on May 25, 2018, now Pat. No. 10,990,683.

(51) Int. Cl.
*G06F 21/57* (2013.01)
*G06F 8/65* (2018.01)
*G06Q 30/02* (2012.01)
*G06F 21/73* (2013.01)

(52) U.S. Cl.
CPC ............ *G06F 21/577* (2013.01); *G06F 8/65* (2013.01); *G06F 21/73* (2013.01); *G06Q 30/0207* (2013.01); *G06F 2221/2109* (2013.01)

(58) Field of Classification Search
CPC .... G06F 21/577; G06F 8/65; G06F 2221/033; G06F 21/73; G06F 2221/2109; G06F 21/44; H04L 63/1433; G06Q 30/0207
USPC .............................. 726/1, 25, 22; 713/1, 171
See application file for complete search history.

(56) References Cited

U.S. PATENT DOCUMENTS

| 5,347,400 | A |  | 9/1994 | Hunter |
| 5,577,248 | A | * | 11/1996 | Chambers, IV ...... G06F 40/194 |
| 5,724,599 | A | * | 3/1998 | Balmer .................. G06F 15/16 713/1 |
| 6,165,173 | A |  | 12/2000 | Kamdar et al. |
| 7,856,026 | B1 | * | 12/2010 | Finan .................. H04L 49/3045 370/413 |

(Continued)

OTHER PUBLICATIONS

U.S. Appl. No. 15/989,462, filed May 25, 2018.

(Continued)

*Primary Examiner* — Faisal M Zaman
(74) *Attorney, Agent, or Firm* — Amin, Turocy & Watson, LLP

(57) ABSTRACT

A mechanism for augmenting security features associated with internet of things devices located in home and/or office environments is provided. A method can comprise as a function of retrieved data associated with a device, displaying vulnerability data associated with the device; facilitating downloading of resolution data to the device based on the vulnerability data; facilitating reconfiguring of the device based on the resolution data; and allocating reward data representative of a reward to a user device based on the reconfiguring of the device being determined to have completed.

20 Claims, 14 Drawing Sheets

(56) References Cited

U.S. PATENT DOCUMENTS

| | | |
|---|---|---|
| 8,671,057 B1 | 3/2014 | Zuili |
| 8,706,081 B1 | 4/2014 | Paya et al. |
| 9,672,707 B2 | 6/2017 | Kerzner |
| 9,811,990 B2 | 11/2017 | Kerzner |
| RE46,768 E * | 3/2018 | Hering ................ H04W 12/128 |
| 10,031,340 B2 | 7/2018 | Lai et al. |
| 10,262,019 B1 | 4/2019 | Reiner et al. |
| 10,270,770 B1 | 4/2019 | Irwan et al. |
| 10,282,550 B1 | 5/2019 | Sheridan et al. |
| 10,333,929 B2 | 6/2019 | Setchell et al. |
| 10,395,221 B1 | 8/2019 | Price et al. |
| 10,492,072 B1 | 11/2019 | Sokolov et al. |
| 2002/0171604 A1 | 11/2002 | Tadysak |
| 2003/0083942 A1 | 5/2003 | Mallon et al. |
| 2003/0229890 A1 | 12/2003 | Lau et al. |
| 2005/0005108 A1 | 1/2005 | Harper |
| 2008/0010218 A1 | 1/2008 | Zank |
| 2008/0168099 A1 | 7/2008 | Skaf |
| 2008/0306946 A1 | 12/2008 | Wu |
| 2010/0100930 A1 * | 4/2010 | King .................. H04L 63/1433 726/1 |
| 2010/0161995 A1 | 6/2010 | Browning |
| 2010/0228613 A1 | 9/2010 | Anderson et al. |
| 2010/0318426 A1 | 12/2010 | Grant et al. |
| 2011/0143661 A1 | 6/2011 | Hartwig et al. |
| 2012/0035990 A1 | 2/2012 | Lewis et al. |
| 2012/0076297 A1 * | 3/2012 | Koziol ............. H04N 21/85406 380/243 |
| 2013/0125028 A1 | 5/2013 | Pearson et al. |
| 2015/0242825 A1 | 8/2015 | Mills |
| 2015/0294339 A1 | 10/2015 | Vargas et al. |
| 2016/0274904 A1 | 9/2016 | Niazi et al. |
| 2017/0091998 A1 | 3/2017 | Piccolo, III |
| 2017/0169614 A1 | 6/2017 | Tommy et al. |
| 2017/0177898 A1 * | 6/2017 | Dillenberger ......... H04L 9/3236 |
| 2017/0262862 A1 * | 9/2017 | Aljawhari ......... G06F 16/90335 |
| 2017/0280266 A1 * | 9/2017 | Brisebois ........... H04B 7/18578 |
| 2018/0007077 A1 | 1/2018 | Boia et al. |
| 2018/0040212 A1 | 2/2018 | Cheng et al. |
| 2018/0077200 A1 | 3/2018 | Apvrille |
| 2018/0077451 A1 | 3/2018 | Yip et al. |
| 2018/0322259 A1 | 11/2018 | Solow et al. |
| 2018/0337771 A1 * | 11/2018 | Baker .................. H04L 9/3236 |
| 2019/0058600 A1 | 2/2019 | Wright et al. |
| 2019/0080095 A1 * | 3/2019 | Usuba .................. G06F 21/552 |
| 2019/0123889 A1 | 4/2019 | Schmidt-Karaca |
| 2019/0238317 A1 * | 8/2019 | Nazarian ............... H04L 9/0637 |
| 2019/0296907 A1 * | 9/2019 | Versteeg ............... H04L 9/0894 |
| 2019/0303583 A1 | 10/2019 | Hosking et al. |
| 2019/0347433 A1 | 11/2019 | Chakravorty et al. |
| 2019/0347651 A1 | 11/2019 | Moreno |
| 2019/0351694 A1 | 11/2019 | Trexler et al. |
| 2020/0004951 A1 | 1/2020 | Speak et al. |
| 2020/0279233 A1 | 9/2020 | Nakamura |
| 2020/0287715 A1 | 9/2020 | Wang |

OTHER PUBLICATIONS

Non Final office action received for U.S. Appl. No. 15/989,462 dated Oct. 9, 2019, 13 Pages.

Final office action received for U.S. Appl. No. 15/989,462 dated Jan. 28, 2020, 11 Pages.

Non Final office action received for U.S. Appl. No. 15/989,462 dated Aug. 7, 2020, 15 Pages.

Notice of Allowance received for U.S. Appl. No. 15/989,462 dated Nov. 20, 2020, 14 Pages.

Ott et al. "Advanced virtual reality technologies for surveillance and security applications", Proceedings of the 2006 ACM international conference on Virtual reality continuum and its applications. ACM, 2006, 8 pages.

* cited by examiner

VIRTUAL REALITY FOR SECURITY AUGMENTATION IN HOME AND OFFICE ENVIRONMENTS

RELATED APPLICATION

The subject patent application is a continuation of, and claims priority to, U.S. patent application Ser. No. 15/989,462 (now U.S. Pat. No. 10,990,683), filed May 25, 2018, and entitled "VIRTUAL REALITY FOR SECURITY AUGMENTATION IN HOME AND OFFICE ENVIRONMENTS," the entirety of which application is hereby incorporated by reference herein.

TECHNICAL FIELD

The disclosed subject matter relates to augmenting security features associated with devices, located in home and/or office environments, connected to the internet of things (IoT) via use of virtual reality (VR) devices, facilities, and/or functionalities.

BACKGROUND

The number of devices in home and/or office environments, connected and communicating with one another via the internet of things (IoT), is expected to grow in an exponential manner. It has now become apparent that these devices can become compromised through malicious intent and/or malware. These devices can also be compromised through: an owner's lassitude in regard to ensuring that the latest firmware and/or software upgrades from the original equipment manufacturer have been appropriately installed during initial setup of the devices; failure to change passwords from the preset manufacturer's default password to a customized unique password of the owner's own choice/creation; and/or a failure in general by users to periodically ensure that device specific firmware and/or software upgrades are downloaded from secure original manufacturer equipment portals, and to ensure that passwords are periodically changed.

DETAILED DESCRIPTION

Figure 1:
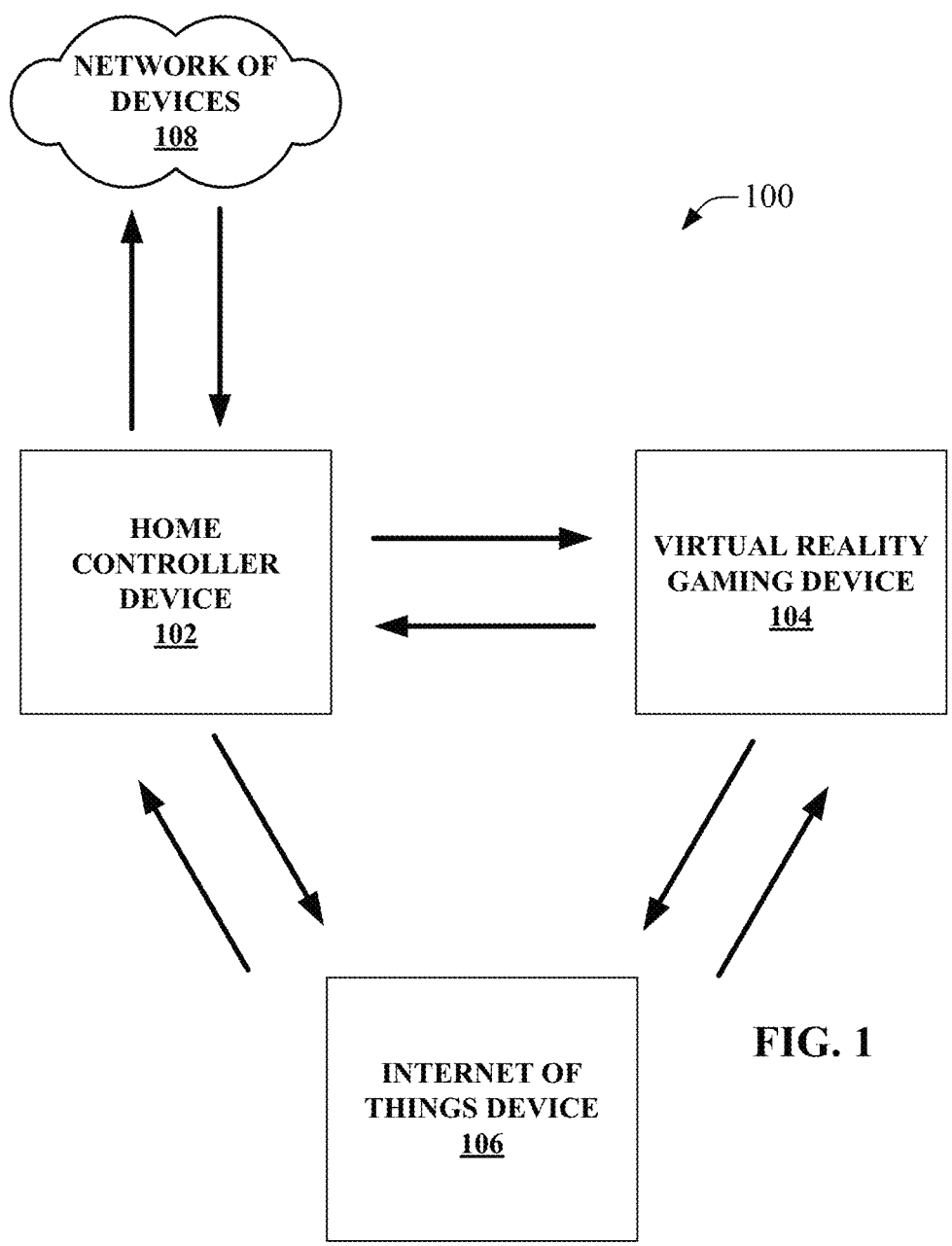
FIG. 1 is an illustration of a system for augmenting security features associated with devices, located in home and/or office environments, connected to the internet of things via use of virtual reality devices, facilities, and/or functionalities, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

It should be realized and appreciated by those of ordinary skill that the foregoing non-limiting example application is merely an illustration of a use of the disclosed and described solution and is provided only for the purposes of exposition. The described and disclosed subject matter is therefore not limited to the foregoing example application, but can find applicability in other more generalized circumstances and use applications.

With reference to the Figures, FIG. 1 illustrates a system 100 that in accordance with various embodiments augments security features associated with devices, located in home and/or office environments, connected to the internet of things via use of virtual reality devices, facilities, and/or functionalities. System 100 can comprise home controller device 102 that can be in wired and/or wireless communications with a virtual reality gaming device 104. Additionally, home controller device 102 can be in wired and/or wireless communications with an internet of things device 106. Further, home controller device 102 can be in wired and/or wireless communications with a network of network devices 108.

Virtual reality gaming device 104, in addition to being in wired and/or wireless communications with home controller device 102 can also be in communications with internet of things device 106. Internet of things device 106, as illustrated, can be in communication with home controller device 102 and/or reality gaming device 104.

Home controller device 102, for purposes of illustration, can be any type of mechanism, machine, device, facility, apparatus, and/or instrument that includes a processor and/or is capable of effective and/or operative communications with a wired and/or wireless network topology. Mechanisms, machines, apparatuses, devices, facilities, and/or instruments that can comprise home controller device 102 can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, consumer and/or industrial appliances and/or instrumentation associated with automotive vehicles, industrial and/or consumer appliances and/or instrumentation associated with aerospace vehicles and/or satellites orbiting in low earth orbit, geosynchronous orbit, and the like. Generally, home controller device 102 can typically be thought of as a small form factor (SFF) device.

Similarly, virtual reality gaming device 104, for purposes of elucidation, can comprise any type of mechanism, machine, device, facility, apparatus, and/or instrument inclusive of a processor, and/or is capable of effective and/or operative wired and/or wireless communication with a network topology. Illustrative mechanisms, machines, apparatuses, devices, facilities, and/or instruments can include server class computing machines and/or databases, tablet computing devices, handheld devices, laptop computers, notebook computers, desktop computers, cell phones, smart phones, consumer appliances and/or instrumentation, industrial devices and/or components, devices and/or appliances associated with aerospace vehicles, consumer devices and/or components associated with automotive vehicles, handheld devices, personal digital assistants, multimedia Internet enabled phones, multimedia players, and the like.

Virtual reality gaming device 104, without loss of generality or limitation of scope, can be any virtual reality gaming device that can be used by users to play virtual reality games. Accordingly and solely for purposes of exposition, virtual reality gaming device 104 can be a virtual reality gaming helmet, a virtual reality gaming wand, a virtual reality gaming controller, and the like. It will nevertheless be appreciated by those having skill in the art that virtual reality gaming device 104 can be any type of small form factor device, such as a portable device that includes or comprises a near field communications aspect, a cell phone device that includes or comprises a near field communications aspect, a computing device that is capable of facilitating near field communications, and the like. It will also be appreciated by those of ordinary skill, that virtual reality gaming device 104 using the included near field communications aspect allows the virtual reality gaming device 104 to communicate with the internet of things device 106 when the virtual reality gaming device 104 is brought into contact with, or close proximity to, the internet of things device 106.

Internet of things device 106 can be any consumer, commercial, or industrial apparatus, device, and/or machine with functionality to be in operative communication, via wired and/or wireless facilities, with a network or group of other disparately dispersed devices. Internet of things device 106 can include any machine, apparatus, device, facilities, and/or instrumentality including server class computing machines and/or databases, tablet computing devices, handheld devices, laptop computers, notebook computers, desktop computers, cell phones, smart phones, consumer appliances and/or instrumentation, industrial devices and/or components, devices and/or appliances associated with aerospace vehicles, consumer devices and/or components associated with automotive vehicles, handheld devices, personal digital assistants, multimedia Internet enabled phones, multimedia players, and the like.

In regard to network of devices 108, this can comprise, for example, a group of database devices, a grouping of server devices, a network of disparate devices such as communication devices, network specific devices, and the like. As will be recognized by those of ordinary skill in the art, a grouping of database devices, server devices, and/or communication devices can be any one or more of base station devices, access point devices, server class computing machines and/or databases, tablet computing devices, handheld devices, laptop computers, notebook computers, desktop computers, cell phones, smart phones, consumer appliances and/or instrumentation, industrial devices and/or components, devices and/or appliances associated with aerospace vehicles, consumer devices and/or components associated with automotive vehicles, handheld devices, personal digital assistants, multimedia Internet enabled phones, multimedia players, and the like.

In regard to functionality of system 100, in accordance with various embodiments, system 100 can perform a discovery process whereby all devices within a defined area (e.g., a home, business, commercial enterprise, . . . ) can be identified. For instance, home controller device 102 can send out messaging over wired and/or wireless communications mediums for each internet of things device 106 to return data representing the pertinent information associated with the internet of things device 106. Such pertinent information can comprise serial numbers, model numbers, manufacturer name, media access control data, international mobile subscriber identifier, firmware version level, software version data, operating system specific data, and/or any other information that can be associated with the internet of things device 106 and that can be used to uniquely and/or generically identify the internet of things device 106 and/or used to uniquely and/or generically classify the internet of things device 106. For instance, the internet of things device 106 can be a digital bedside alarm clock, there can be multiple such digital bedside alarm clocks within the defined area (e.g., a digital bedside alarm clock in each bedroom of the house), so when home controller device 102 sends out polling messages, each bedside alarm clock extant within the house can return unique identifying data such as, serial number, model number, manufacturer name, media access control data, firmware version level, software version data, and the like. Additionally, and/or alternatively, each bedside alarm clock extant within the house can respond with generic identifying data such as: alarm_clock (e.g., identifying itself as being a "generic" alarm clock), firmware version level, software version data, operating system specific data, etc.

Home controller device 102, in response to receiving the pertinent information associated with the internet of things device 106, can associate each of the attributes of the returned pertinent information with a unique identifier. In accordance with one or more various embodiments, home controller device 102 can generate a pseudo-random number based, for example, on one or more attributes of the returned pertinent information, wherein one or more of the attributes of the returned pertinent information can be used as seed values input to a pseudorandom number generator which in turn can generate the unique identifier. Additionally and/or alternatively, home controller device 102 can generate a unique identifier using one or more cryptographic techniques, such as hashing algorithms, wherein one or more of the attributes of the returned pertinent information can be used as a key, three-party block chaining algorithms, wherein data is encrypted using respective public/private cryptographic keys from at least three (or more) disparate devices, and the like.

The generated unique identifier and the returned pertinent information from each responding internet of things device 106 can be persisted to memory and/or to storage as a database tuple in a local database of database tuples, for example. In accordance with another example, the generated unique identifier can be used as the head entry linked which each of the attributes included in the pertinent information from the responding internet of things device 106 can form a subsequent entry linked to create a chain of linked entries that can be stored to memory and/or to storage for long term retention. As will be appreciated by those of ordinary skill in the art other disparate data structure constructs (e.g., arrays, tables, heaps, binary trees, clusters, combinations and permutations of the foregoing, and the like) can be used with equal facility and/or functionality to achieve the same end.

Home controller device 102, based on having discovered one or more extant internet of things device 106 within a defined area, can retrieve up-to-date security information data representing one or more vulnerabilities associated with the one or more internet of things device 106, blacklists/white lists associated with the one or more extant internet of things device 106, malware alerts and/or viruses that can be deleterious to the proper functioning of the one or more extant internet of things device 106, and the like. Home controller device 102 based, for instance, on the retrieved up-to-date security information data and the established local database of database tuples, can direct a user, via use of virtual reality gaming device 104, to explore within the defined area for internet of things devices 106 that have been ascertained in the retrieved up-to-date security information data as having vulnerabilities. For instance, home controller device 102 can facilitate the virtual reality gaming device 104 to display a message that indicates to the user that an internet of things device 106 has been identified as having an identified or identifiable vulnerability. The message can be displayed in a display device associated with the virtual reality gaming device 104 when the virtual reality gaming device 104 is brought into contact with, and/or in close proximity to, the internet of things device 106.

At the point that the virtual reality gaming device 104 is brought into contact with, and/or is in close proximity to, the internet of things device 106, home controller device 102 can query a network device associated with a network of devices 108 for information needed to remedy the identified or identifiable vulnerability. Information obtained from the network device of the network of devices 108 can include firmware upgrades, software upgrades, operating system upgrades, remedial software necessary to patch software and/or hardware vulnerabilities, and the like. Additional information that can be obtained from the network device of the network of devices can include instructional information necessary to aid the user, through use of the virtual reality gaming device 104, in implementing the firmware upgrades, software upgrades, operating system upgrades, remedial software required to patch the software and/or hardware vulnerabilities, and the like.

Home controller device 102 subsequent to querying the network device of the network of network devices 108 can provide instruction to the user, via virtual reality gaming device 104, on how the user can take actions to remedy the identified vulnerabilities associated with the internet of things device 106. Once the identified vulnerabilities with the internet of things device 106 have been remedied, home controller device 102 can update its local databases (e.g., local database of database tuples) with any relevant data indicating the internet of things device 106 has been upgraded and identified vulnerabilities addressed. At this point home controller device 102 can also allocate reward points to the user to reward the user for augmenting security features associated with internet of things device 106. The rewards can take the form of discounts, rewards points, monetary rewards, and the like, that the user can use in gaming environments while using the virtual reality gaming device 104.

Figure 2:
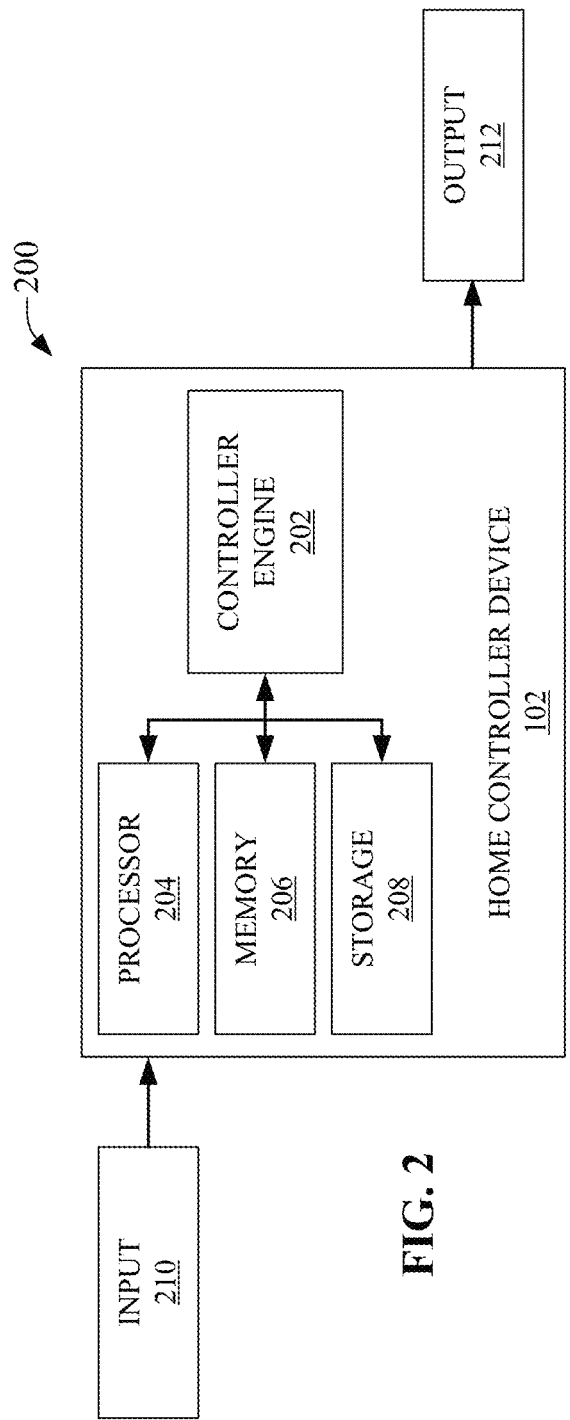
FIG. 2 is a further depiction of a system for augmenting security features associated with devices, located in home and/or office environments, connected to the internet of things via use of virtual reality devices, facilities, and/or functionalities, in accordance with aspects of the subject disclosure.

Turning now to FIG. 2 that depicts a system 200 for augmenting security features associated with devices, located in home and/or office environments, connected to the internet of things via use of virtual reality gaming devices, facilities, and/or functionalities, in accordance with various embodiments. As illustrated, system 200 depicts a home controller device 102 that can comprise controller engine 202 coupled to a processor 204, memory 206, and storage 208. Controller engine 202 can be in communication with processor 204 for facilitating operation of computer or machine executable instructions and/or components by controller engine 202, memory 206, for storing data and/or the computer or machine executable instructions and/or components, and storage 208 for providing longer term storage of data and/or machine and/or computer readable instructions. Additionally, system 200, and more specifically home controller device 102, can also receive input 210 for use, manipulation, and/or transformation by controller engine 202 to produce one or more useful, concrete, and tangible result, and/or transform one or more articles to different states or things. Further, system 200, and in particular home controller device 102, can also generate and output the useful, concrete, and tangible results and/or the transformed one or more articles produced by controller engine 202 and output as output 212.

As noted above, system 200, home controller device 102, for purposes of elucidation, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 200 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

As noted above, system 200 and in particular home controller device 102 can comprise controller engine 202 that can perform a discover process wherein devices (e.g., internet of things devices 106) within a bounded and defined area, such as a home, business, manufacturing shop floor, commercial park, etc. can be discovered and identified. The devices extant within the bounded and defined area can be devices that can be in operative communications with home controller device 102, and in particular controller engine 202, via a wired communications network, such as a power line networking paradigm, wherein the electrical power infrastructure within the bounded and defined area is utilized as a communications conduit. Additionally and/or alternatively, the devices extant in the bounded and defined area can be devices that can be communicatively coupled to home controller device 102 (and controller engine 202) via one or more wireless networking paradigm. In accordance with this aspect, controller engine 202 can send out messaging over the wired and/or wireless communication medium to each device. Messaging can comprise data requesting the devices (internet of things device 106) to return data representing pertinent information associated with themselves. The pertinent information can comprise, for instance, serial numbers, model numbers, manufacturer name, media access control data, international mobile subscriber identifier data, firmware version level data, software version data, operating system specific data, and/or any other information that can be associated with the internet of things device 106, and that can be used to uniquely and/or generically identify the internet of things device 106, and/or can be used to uniquely and/or generically classify the internet of things device 106.

Controller engine 202, in response to receiving the pertinent information from the internet of things device 106 can associate each of the attributes comprising the pertinent information (e.g., serial numbers, model numbers, manufacturer name, media access control data, international mobile subscriber identifier data, firmware version level data, software version data, operating system specific data, and the like) with a unique identifier. Controller engine 202 can, for example, use as a unique identifier a generated pseudo-random number that can be generated by using one or more of the attributes returned as pertinent information from the internet of things device 106. Additionally and/alternatively, controller engine 202 can generate a identify using one or more cryptographic methodologies, such as hashing algorithms, block chain algorithms, and the like.

Controller engine 202, having associated the generated pseudo-random number with the one or more attributes returned as pertinent information from the internet of things device 106 to form a database tuple, can store the database tuple to memory 206 and/or storage 208. The database tuple stored to memory 206 and/or storage 208 can form a database of database tuples representative of the entirety of extant internet of things devices that can have been discovered by controller engine 202 within the defined and bounded area.

Controller engine 202, based on having discovered one or more internet of things devices (e.g. internet of things device 106) within the defined in bounded area, can retrieve, from a cloud facility (e.g., a network device of a grouping of network devices 108), up-to-date security information data representing one or more software and/or hardware/firmware vulnerabilities associated with each of the discovered internet of things devices. Each retrieved up-to-date security information data for each of the discovered internet of things devices can represent one or more vulnerabilities associated with the one or more internet of things devices, blacklist data and/or white list data associated with the one or more internet of things devices, malware alerts and/or virus notifications that identified/known malware and/or viruses have been identified as being harmful to the proper operation of the discovered one or more extant internet of things devices, and the like.

Controller engine 202 based on the retrieved up-to-date security information data and/or the established local database of database tuples stored to memory 206 and/or storage 208, can direct the user, by use of a virtual reality gaming device 104, to explore within the defined and bounded area for internet of things devices 106 that have been ascertained in the retrieved up-to-date security information data as having vulnerabilities. For instance, controller engine 202 can facilitate the virtual reality gaming device 104 to display a message that indicates to the user that an internet of things device 106 has been identified as having been identified or identifiable vulnerability. As has been noted above, the message can be displayed in a display device associated with the virtual reality gaming device 104 when the virtual reality gaming device 104 is brought into contact with, and/or in close proximity to, the internet of things device 106.

When the virtual reality gaming device 104 is brought into contact with, and/or is in close proximity to, the internet of things device 106, controller engine 202 can query the cloud facility for information necessary to remedy the identified and/or identifiable vulnerabilities. Information obtained from the cloud facility can include data related to firmware upgrades, software upgrades, operating system upgrades, remedial software necessary to patch software and/or hardware vulnerabilities, and the like. Additional information that can also be obtained from the cloud facility can relate to instructional information needed to aid the user, through use of the virtual reality gaming device 104, in implementing and/or installing the firmware upgrades, software upgrades, operating system upgrades, remedial software required to patch the software and/or hardware vulnerabilities, and the like.

Controller engine 202, subsequent to querying the cloud facility, can provide instruction to the user, via virtual reality gaming device 104, on how the user can take remedial actions to remedy the identified vulnerabilities associated with each and every internet of things device 106. Once the identified vulnerabilities have been remedied, controller engine 202 can update the established local database of database tuples stored to memory 206 and/or storage 208 with data that indicates that the internet of things device 106 has been upgraded and that identified vulnerabilities have been remedied. At this point, controller engine 202 can allocate reward points to the user. The reward points can be a reward for the user having augmented security features associated with internet of things device 106. Generally, the rewards can take the form of discount coupons, reward points, money rewards, and the like, and can be used within gaming environments while the user employs the virtual reality gaming device 104.

Figure 3:
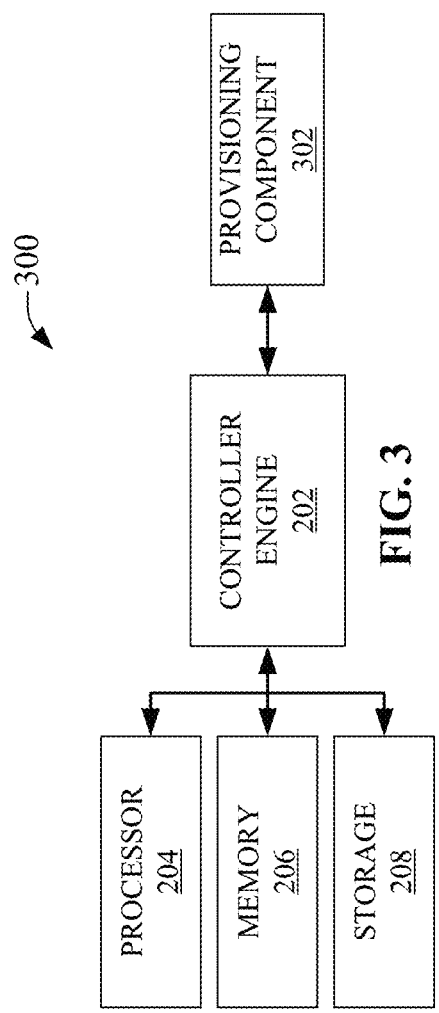
FIG. 3 provides illustration of an additional system for augmenting security features associated with devices, located in home and/or office environments, connected to the internet of things via use of virtual reality devices, facilities, and/or functionalities, in accordance with aspects of the subject disclosure.

FIG. 3 provides additional illustration of system 200 now illustrated as system 300 for augmenting security features associated with devices, located in home and/or office environments, connected to the internet of things via use of virtual reality gaming devices, facilities, and/or functionalities, in accordance with various embodiments. System 300 can comprise provisioning component 302 that can utilize the functionalities and facilities provided by controller engine 202, processor 204, memory 206, and storage 208 to send out messaging over wired and/or wireless communication mediums to each internet of things device 106 for it to return data representing pertinent information associated with each of the internet of things devices 106. Additionally, provisioning component 302, on receiving the return data can associate each attribute included in the returned pertinent information with a unique identifier. Provisioning component 302 can generate the unique identifier through use of a pseudo-random number generator, wherein one or more of the attributes included in the returned pertinent information can be utilized as a seed value input to the pseudorandom number generator. Provisioning component 302 can thereafter persist the unique identifier associated with the one or more attributes included in the returned pertinent information for a specific internet of things device to memory 206 and/or storage 208 as a database tuple of a grouping of database tuples.

Figure 4:
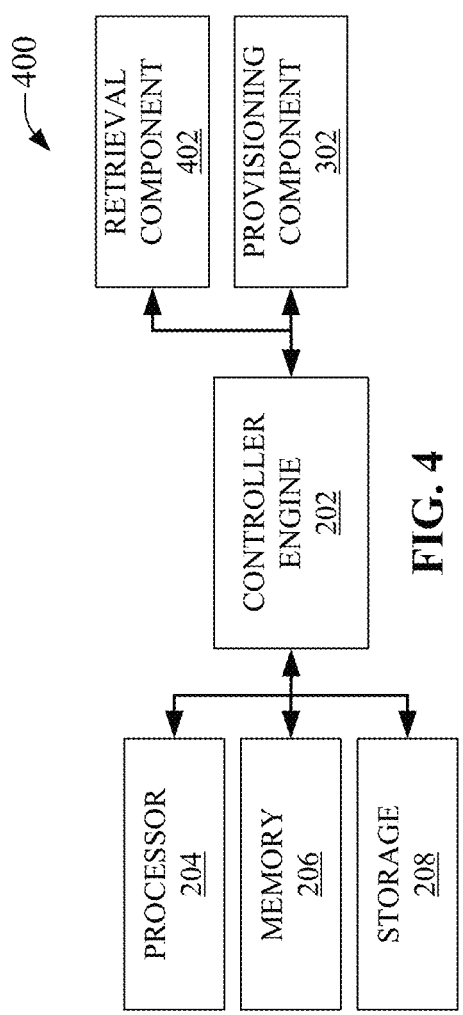
FIG. 4 provides illustration of an additional system for augmenting security features associated with devices, located in home and/or office environments, connected to the internet of things via use of virtual reality devices, facilities, and/or functionalities, in accordance with aspects of the subject disclosure.

FIG. 4 provides additional illustration of system 200 now illustrated as system 400 for augmenting security features associated with devices, located in home and/or office environments, connected to the internet of things via use of virtual reality gaming devices, facilities, and/or functionalities, in accordance with various embodiments. As illustrated, system 400 can include retrieval component 402 that can utilize the functionalities and facilities provided by controller engine 202, provisioning component 302, processor 204, memory 206, and storage 208 to retrieve up-to-date security information data representing one or more vulnerabilities associated with the one or more internet of things device 106, blacklists and/or white lists, malware alerts and/or virus notifications, and the like.

Figure 5:
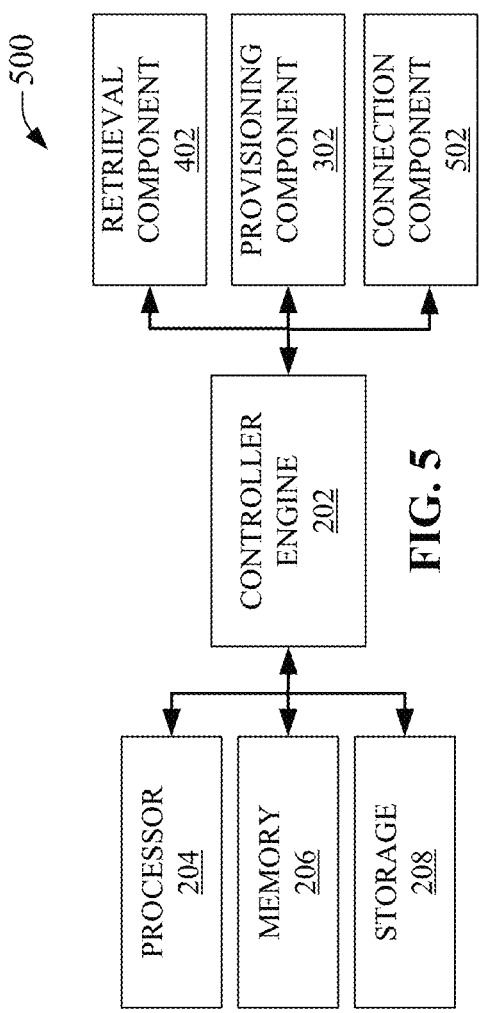
FIG. 5 provides illustration of an additional system for augmenting security features associated with devices, located in home and/or office environments, connected to the internet of things via use of virtual reality devices, facilities, and/or functionalities, in accordance with aspects of the subject disclosure.

FIG. 5 provides additional depiction of system 200 now illustrated as system 500 for augmenting security features associated with devices, located in home and/or office environments, connected to the internet of things via use of virtual reality gaming devices, facilities, and/or functionalities, in accordance with various embodiments. As depicted, system 500 can include connection component 502 that, in conjunction with one or more functionalities and/or facilities provided by retrieval component 402, controller engine 202, provisioning component 302, processor 204, memory 206, and/or storage 208 can establish communications with a virtual reality gaming device 104. Connection component 502 can utilize the retrieved up-to-date security information data and details included in a relevant database tuple of the grouping of database tuples for an internet of things device 106 to establish a communication with the virtual reality gaming device 104. Connection component 502 can facilitate a coupling of the home controller device 102 with the virtual reality gaming device 104 in order to supply a user of virtual reality gaming device 104 with information needed to remedy security vulnerabilities associated with the one or more identifiable internet of things devices.

Figure 6:
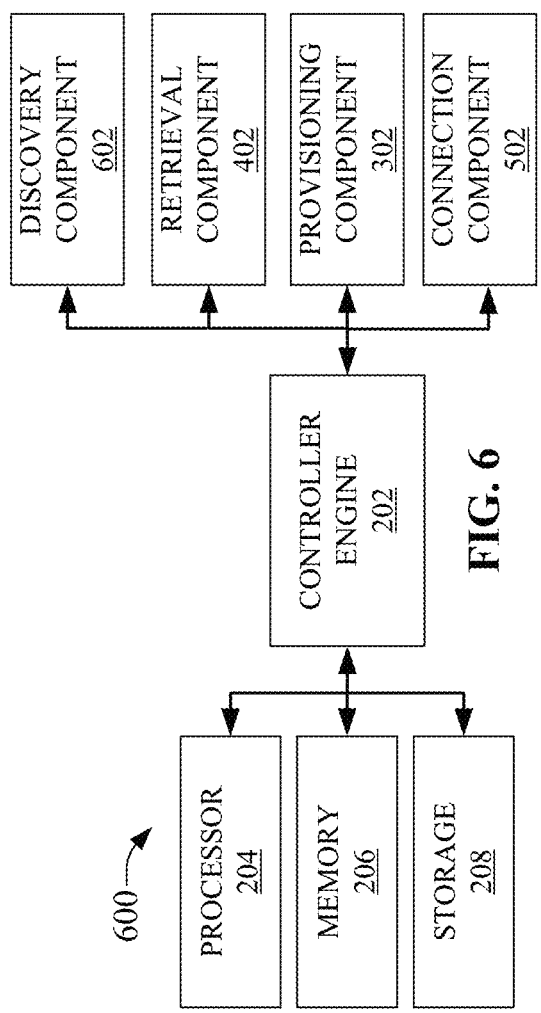
FIG. 6 provides illustration of an additional system for augmenting security features associated with devices, located in home and/or office environments, connected to the internet of things via use of virtual reality devices, facilities, and/or functionalities, in accordance with aspects of the subject disclosure.

FIG. 6 provides additional illustration of system 200 now illustrated as system 600 for augmenting security features associated with devices, located in home and/or office environments, connected to the internet of things via use of virtual reality gaming devices, facilities, and/or functionalities, in accordance with various embodiments. System 600 can include discovery component 602 that can utilize the facilities and functionalities provided by connection component 502, retrieval component 402, provisioning component 302, controller engine 202, processor 204, memory 206, and/or storage 208 to discover vulnerabilities associated with internet of things devices (e.g., internet of things device 106) located within a home or office environment. In accordance with this aspect, discovery component 602 can operated in collaboration with a virtual reality gaming device (e.g., virtual reality gaming device 104) to allow a user of the virtual reality gaming device to see a listing on an associated display of all, or a partial listing of, the internet of things devices located in the home or office environment; when the virtual reality gaming device 104 is brought into contact, or within close proximity to, the internet of things device more device specific information regarding vulnerabilities and possible actions that can be taken by the user to remedy the identified vulnerabilities can be displayed.

Figure 7:
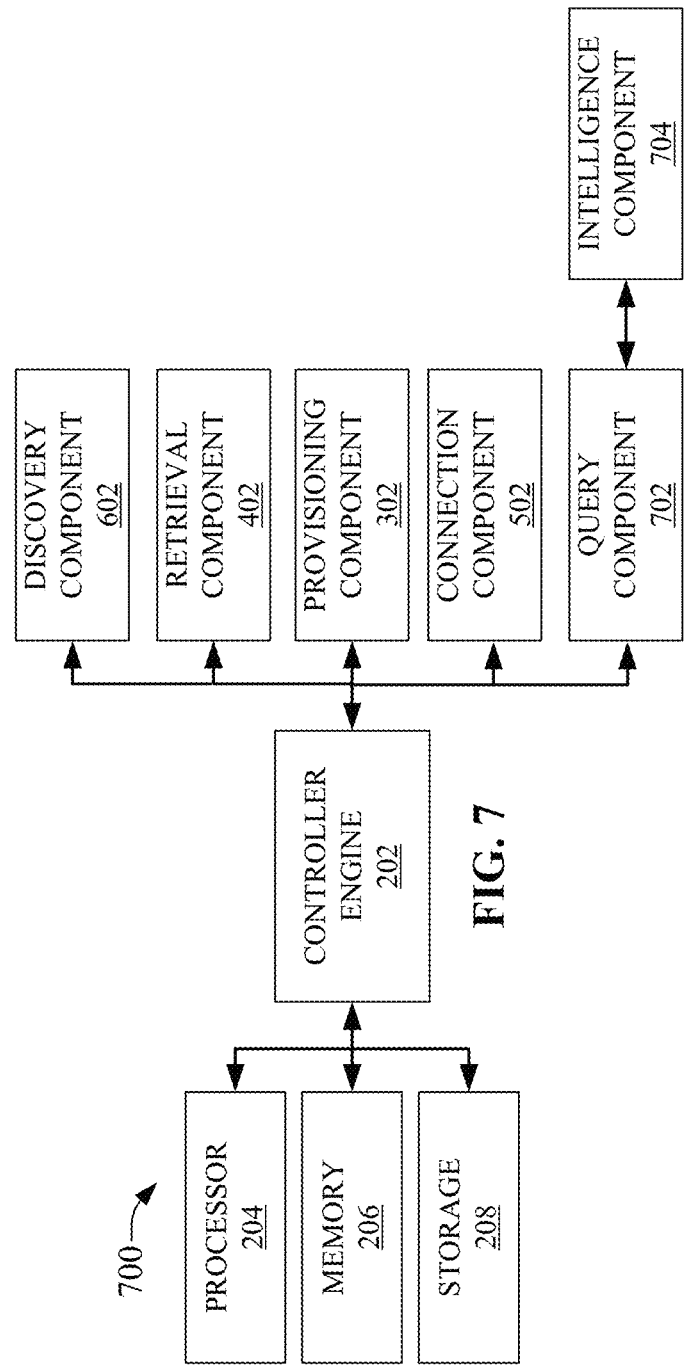
FIG. 7 provides illustration of an additional system for augmenting security features associated with devices, located in home and/or office environments, connected to the internet of things via use of virtual reality devices, facilities, and/or functionalities, in accordance with aspects of the subject disclosure.

FIG. 7 provides additional depiction of system 200 now illustrated as system 700 for augmenting security features associated with devices, located in home and/or office environments, connected to the internet of things via use of virtual reality gaming devices, facilities, and/or functionalities, in accordance with various embodiments. In this instance, system 700 can include query component 702 and intelligence component 704 that can operate in collaboration with discovery component 602, connection component 502, retrieval component 402, provisioning component 302, controller engine 202, processor 204, memory 206, and storage 208. When the virtual reality gaming device 104 is in close proximity to (and/or in contact with) an internet of things device 106, query component 702, as a function of the pertinent information that can have been stored to, and retrieved from, a database of tuples stored to memory 206 and/or storage 208, can obtain from a cloud facility (e.g., a network device of a network of networked devices 108) additional data regarding vulnerabilities that can currently be affecting the internet of things device 104. The additional data regarding vulnerabilities that can currently be affecting the Internet of things device 104 can include software upgrades, operating system upgrades, firmware upgrades, remedial software needed to patch software and/or hardware vulnerabilities, close open networking ports, and the like. Further, the additional data can also include instructional information needed to aid the user, through use of the virtual reality gaming device 104, in implementing the firmware upgrades, software upgrades, operating system upgrades, remedial software required to patch the software and/or hardware vulnerabilities, and the like.

Also illustrated in FIG. 7 is an intelligence component 704 that can be used in conjunction with, for example, network traffic data representing statistical data for each internet of things device 106, disk (or storage) usage data representative of variations of disk (or storage) usage over a defined or definable periods of time, and networking port data representing ports that are, and have recently been opened/closed, for each internet of things device 106. The network traffic data, disk usage data, and/or networking port data can be stored to, and retrieved from, memory 206 and/or storage 208. Intelligence component 704 through use of artificial intelligence can facilitate automating one or more features described herein. The embodiments (e.g., in connection with determining unusual variations in network traffic data, unusual storage usage data patterns, and/or suspicious opening/closing of networking ports associated with the internet of things device 106) can employ various artificial intelligence based schemes for carrying out various embodiments thereof. For example, classifiers and/or pattern recognition/matching techniques can be used to identify variations in network traffic data, disparities in storage usage, and unaccounted for opening and/or closing of network ports.

A classifier, for example, is typically a function that maps an input attribute vector, $x=(x1, x2, x3, \ldots xN)$, to a confidence that the input belongs to a certain class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in a space that comprises a grouping of possible inputs, the hypersurface attempts to split triggering criteria from non-triggering events. Intuitively, this makes the classification correct for testing data that is near, but not identical to groups of training data that can have been used to develop classifier. Other directed and undirected multiple classification approaches that can be employed can include, for instance, naïve Bayes, Bayesian networks, decision trees, neural networks, fuzzy logic models, and probabilistic classification models providing different patterns of independence. Classification as used herein is inclusive of statistical regression that is utilized to develop models of priority.

Figure 8:
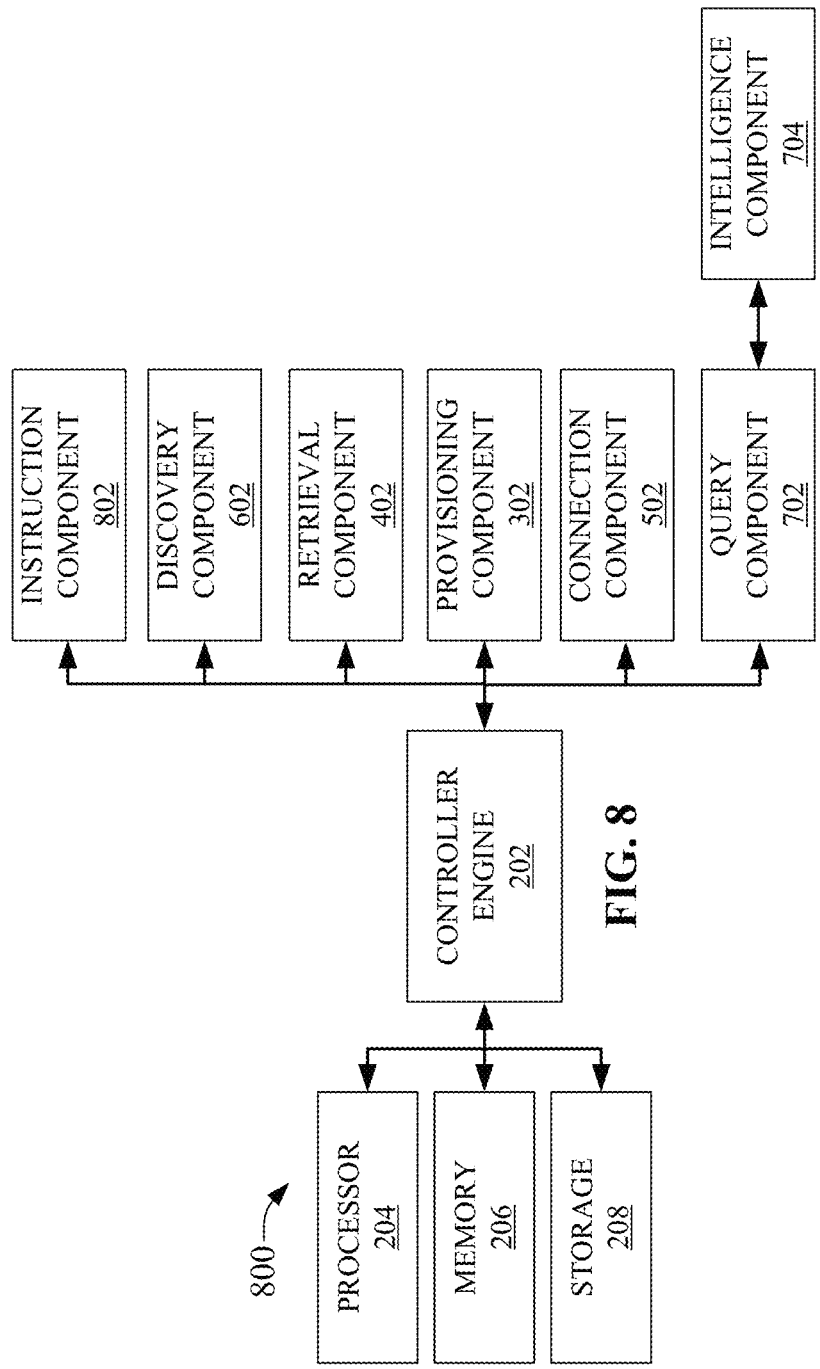
FIG. 8 provides illustration of an additional system for augmenting security features associated with devices, located in home and/or office environments, connected to the internet of things via use of virtual reality devices, facilities, and/or functionalities, in accordance with aspects of the subject disclosure.

FIG. 8 provides additional illustration of system 200 now depicted as system 800 for augmenting security features associated with devices, located in home and/or office environments, connected to the internet of things via use of virtual reality gaming devices, facilities, and/or functionalities, in accordance with various embodiments. System 800 can include instruction component 802 that can utilize the facilities and functionalities provided by query component 702 and associated intelligence component 704, discovery component 602, connection component 502, retrieval component 402, provisioning component 302, controller engine 202, processor 204, memory 206, and/or storage 208 to facilitate display on virtual reality gaming device 104 of instructions pertaining to resolving and remedying identified vulnerabilities associated with each and every internet of things device 106. For instance, if the vulnerability associated with an internet of things device 106 relates to changing a password or resetting the password from the manufacturers default password to a unique password of the user's choosing, instruction component 802 can supply the necessary instructions needed to change or reset the password, as well as facilitate display of the instructions need to accomplish the changing of the password on a device associated with the virtual reality gaming device 104. The user can then use the displayed instructions to undertake change or resetting of the password on the internet of things device 106 from a first password to a second password.

Figure 9:
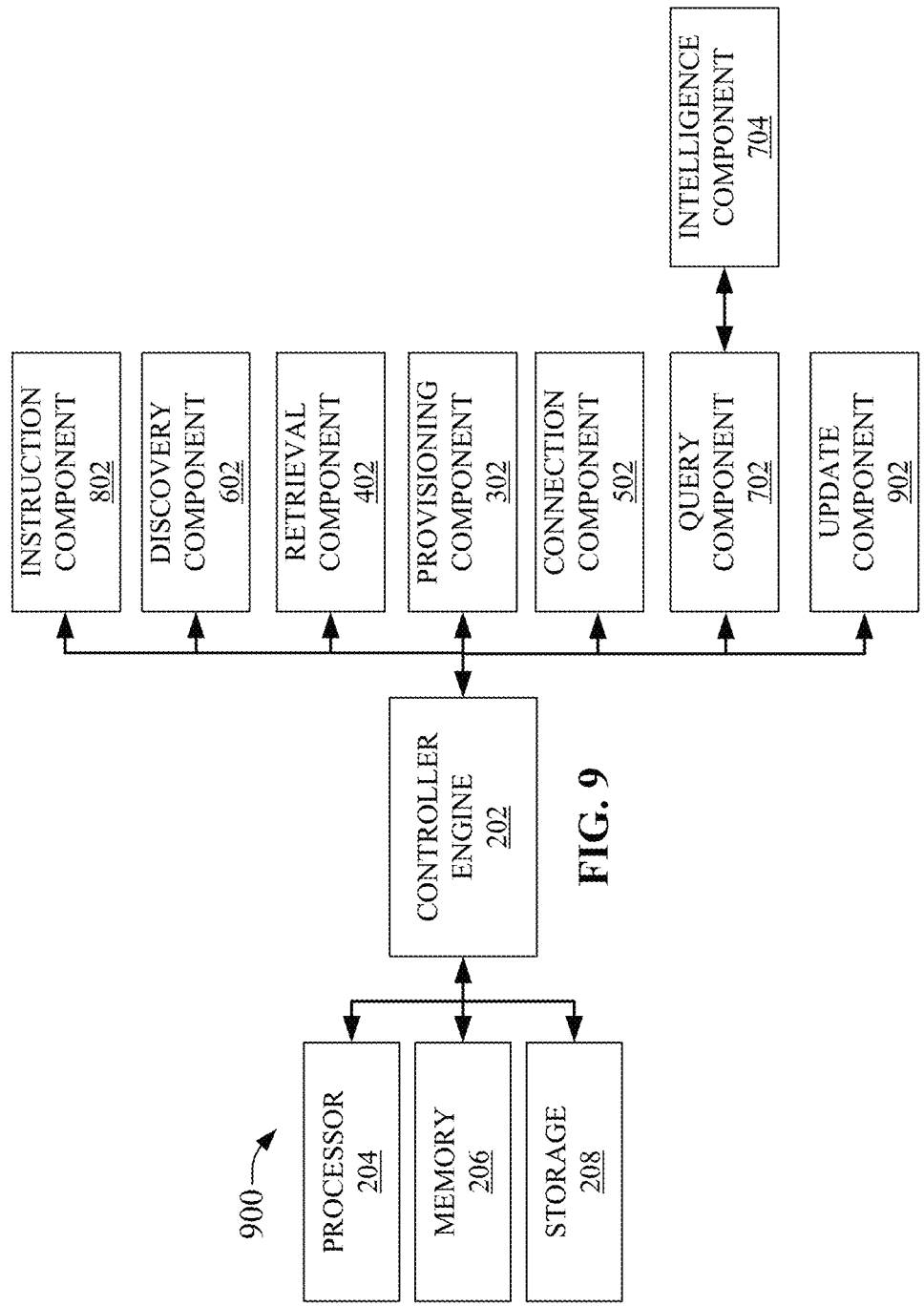
FIG. 9 provides illustration of an additional system for augmenting security features associated with devices, located in home and/or office environments, connected to the internet of things via use of virtual reality devices, facilities, and/or functionalities, in accordance with aspects of the subject disclosure.

FIG. 9 provides additional depiction of system 200 now illustrated as system 900 for augmenting security features associated with devices, located in home and/or office environments, connected to the internet of things via use of virtual reality gaming devices, facilities, and/or functionalities, in accordance with various embodiments. System 900 can include update component 902 that in conjunction with instruction component 802, query component 702 and intelligence component 704, discovery component 602, connection component 502, retrieval component 402, provisioning component 302, controller engine 202, processor 204, memory 206, and storage 208, once the identified vulnerabilities have been remedied, can update the database tuple of database tuples stored to memory 206 and/or storage 208 with update data that indicates that the internet of things device 106 has been upgraded and that the identified vulnerabilities have been remedied.

Figure 10:
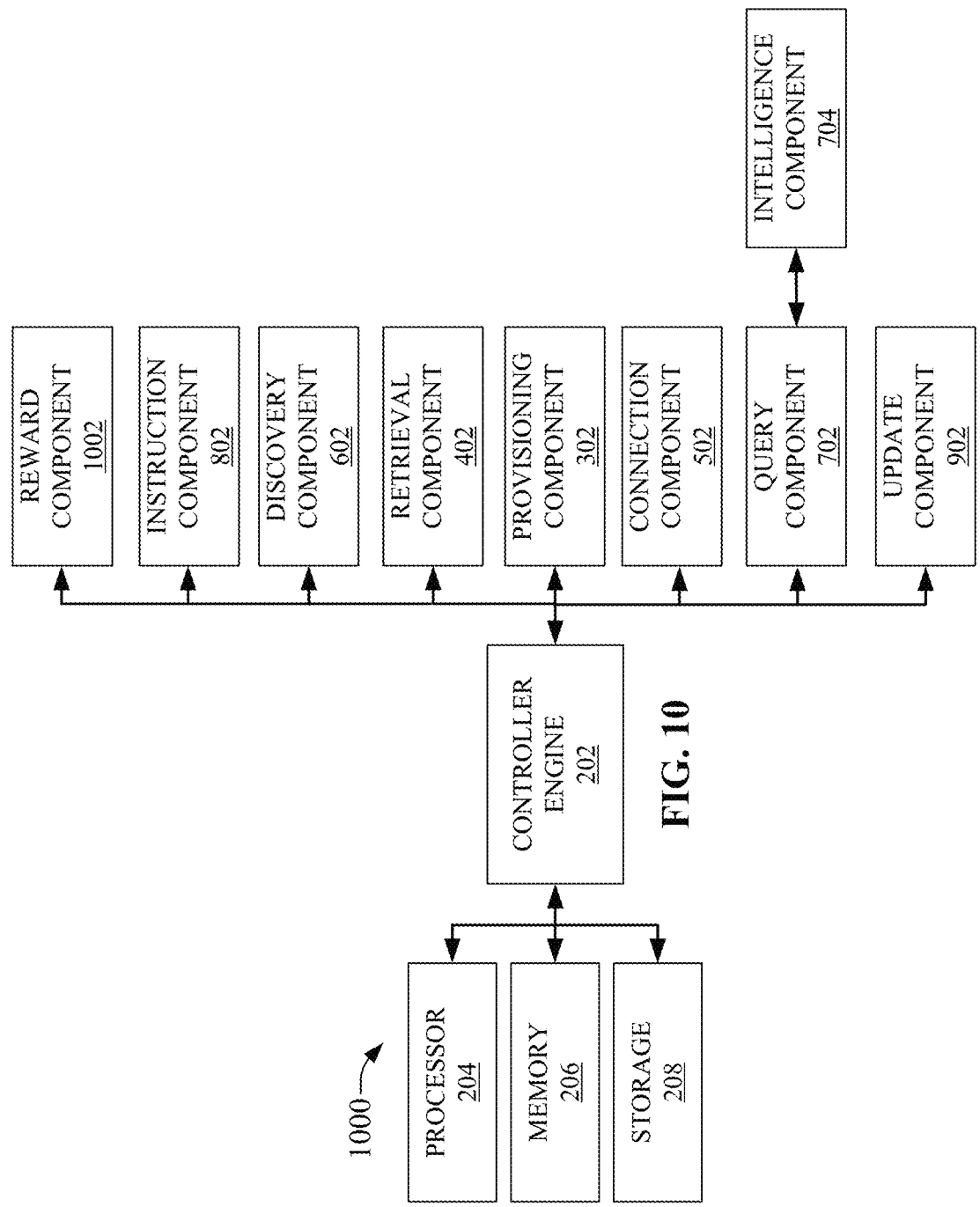
FIG. 10 provides illustration of an additional system for augmenting security features associated with devices, located in home and/or office environments, connected to the internet of things via use of virtual reality devices, facilities, and/or functionalities, in accordance with aspects of the subject disclosure.

FIG. 10 provides additional illustration of system 200 now illustrated as system 1000 for augmenting security features associated with devices, located in home and/or office environments, connected to the internet of things via use of virtual reality gaming devices, facilities, and/or functionalities, in accordance with various embodiments. System 1000 can comprise reward component 1002 that in collaboration with the facilities and/or functionalities associated with update component 902 that in conjunction with instruction component 802, query component 702 and intelligence component 704, discovery component 602, connection component 502, retrieval component 402, provisioning component 302, controller engine 202, processor 204, memory 206, and storage 208, can assign or allocate rewards points to the user for each vulnerability that has been corrected and/or remedied. Typically, the rewards can take the form of discount coupons, reward points, monetary rewards, and the like. The rewards can be redeemed and/or used within one or more gaming environments, and can provide incentives to encourage users to periodically ensure that the security of their internet of things devices is maintained on a periodic basis.

Figure 11:
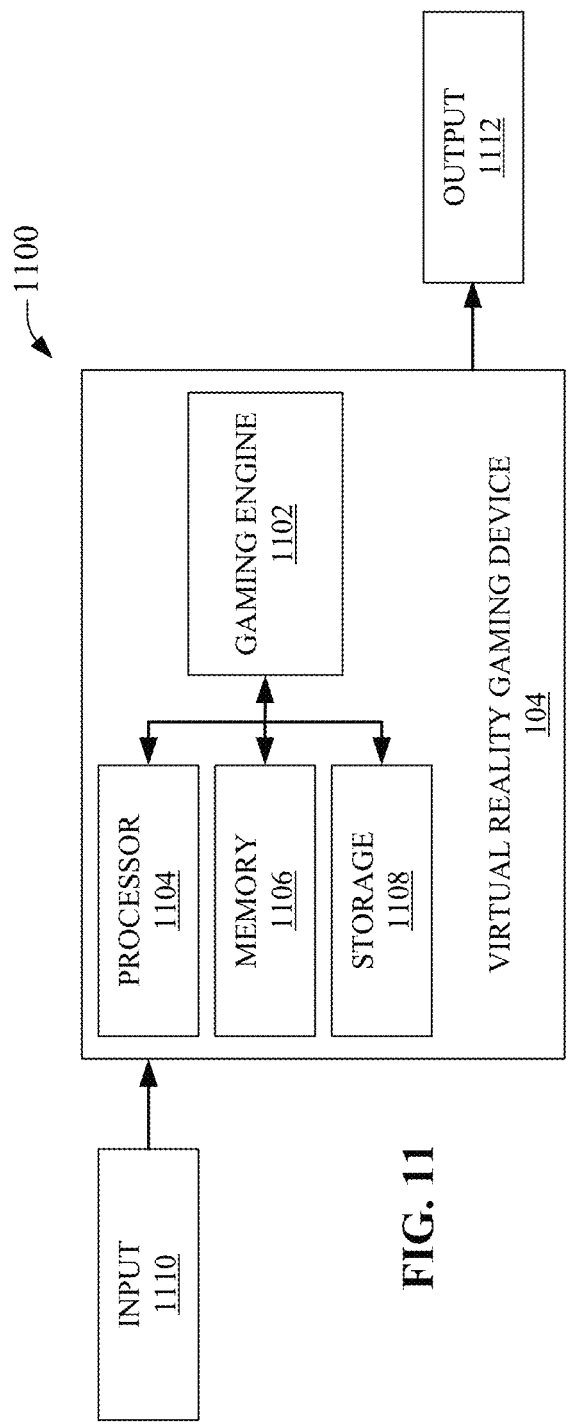
FIG. 11 provides illustration of an additional system for augmenting security features associated with devices, located in home and/or office environments, connected to the internet of things via use of virtual reality devices, facilities, and/or functionalities, in accordance with aspects of the subject disclosure.

FIG. 11 illustrates a system 1100 for augmenting security features associated with devices, located in home and/or office environments, connected to the internet of things via use of virtual reality gaming devices, facilities, and/or functionalities, in accordance with various embodiments. System 1100 depicts a virtual reality gaming device 104 that can comprise gaming engine 1102 coupled to a processor 1104, memory 1106, and storage 1108. Gaming engine 1102 can be in communication with processor 1104 for facilitating operation of computer or machine executable instructions and/or components by gaming engine 1102, memory 1106, for storing data and/or the computer or machine executable instructions and/or components, and storage 1108 for providing longer term storage of data and/or machine and/or computer readable instructions. Additionally, system 1100, and more specifically virtual reality gaming device 104, can also receive input 1110 for use, manipulation, and/or transformation by gaming engine 1102 to produce one or more useful, concrete, and tangible result, and/or transform one or more articles to different states or things. Further, system 1100, and in particular virtual reality gaming device 104, can also generate and output the useful, concrete, and tangible results and/or the transformed one or more articles produced by gaming engine 1102 and output as output 1112.

As noted above, system 1100 and in particular virtual reality gaming device 104, for purposes of elucidation, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 1100 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

Gaming engine 1102 in collaboration with the functionalities and facilities provided by home controller device 102 (and in particular the functionalities and facilities supplied by controller engine 202) can ensure that a user periodically addresses and augments security features associated with devices connected to the internet of things infrastructure. Gaming engine 1102 can facilitate the foregoing by displaying, in an associated display device, a listing of internet of things devices that can have been discovered and identified as being situated within a home environment or located within an industrial/commercial enterprise environment (or within selectively defined or selectively definable areas within the home environment or the industrial/commercial enterprise environment). Thereafter, if virtual reality gaming device 104 is a virtual reality helmet device (e.g., virtual reality goggles), when the user looks, through the virtual reality helmet device, in the general direction of an internet of things device, superimposed within the display can be one or more options that the user can select to interact with the internet of things device. For example, in various embodiments, when the user looks in the general direction of the internet of things device and also taps or touches the internet of things device, gaming engine 1102 can cause home controller device 102 to gather pertinent information needed to fix vulnerabilities associated with the internet of things device. Further, gaming engine 1102 can facilitate allocation of reward points to the user (or a user's avatar within a gaming environment) based on the user having remedied or correct an identified vulnerability.

In accordance with one or more embodiments, gaming engine 1102 can facilitate retrieval from home controller device 102 and display of basic security information about a selected internet of things device. Such basic security information can, for example, comprise details regarding a password set on the internet of things device. In this instance, gaming engine 1102, for example, can determine that the password currently set on the internet of things device has aged out (e.g., the password was last changed in March 2010) and then can request that the user change the password. Similarly, gaming engine 1102 can determine that the password has never been set, or if set has never been changed from the manufacturer's default password, and as such gaming engine 1102 can request that the user change the password. In the same vein, gaming engine 1102 can also ensure that the password selected by the user meets certain standards and criteria (e.g. the password should to be of a certain minimum/maximum length with a variability of alphanumeric character, the password should not comprise character sets that can be found in one or more identifiable language dictionaries, etc.).

In accordance with further embodiments, gaming engine 1102 can facilitate the execution of port scans, by home controller device 102, on the selected internet of things device 106. One example port scan that can be used for this purpose, without limitation or loss of generality, is network mapper (nmap): a tool that can be used to discover hosts and services on a computer network, and construct a "map" of the network. Once home controller device 102 returns the result of the port scan, for example, as a ranked list comprising ports open on the selected internet(of things device 106, gaming engine 1102 can display the returned list to the user, highlighting ports that have been deemed to be suspicious and the consequences that can ensue should the ports be left open, and request that the user close the ports. Should the user choose to close the suspiciously open ports, gaming engine 1102, can relay the user's selection to home controller device 102 whereupon home controller device 102 can facilitate closure of the open port(s). Rewards points can then be allocated or assigned to the user for successfully having ensured the closure of suspicious ports.

In accordance with yet further embodiments, gaming engine 1102 can facilitate execution of one or more network vulnerability scans, by functionalities and facilities associated with home controller device 102, on a selected internet of things device 106. Example network vulnerability scans can include Nessus, IoT scanner, etc. Once home controller device 102 returns the result of the network vulnerability scans, for example, a ranked list comprising top critical vulnerabilities associated with the selected internet of things device 106, gaming engine 1102 can display the ranked list to the user, identifying vulnerabilities that should be rectified with urgency, requesting that the user remedy the identified vulnerabilities, and asking the user as to whether or not the user wishes to obtain instructions on how the identified vulnerabilities can be resolved. Where the user acknowledges that the identified vulnerability should be rectified, gaming engine 1102 can relay the user's acknowledgement to home controller device 102 whereupon home controller device 102 facilitate remedying the identified vulnerability. Remedying of the identified vulnerability can entail obtaining software and/or hardware of/firmware patches from a reliable third-party website or from the original equipment manufacturer website and thereafter applying the patch in a manner prescribed by the original equipment manufacturer or the reliable third-party website. Once again, rewards points can then be allocated or assigned to the user for successfully having performed the foregoing actions.

In regard to identifying vulnerabilities through execution of network vulnerability scans, since malware is continually and constantly evolving, the identification and resolution of vulnerabilities can be a continuous and ongoing process. Therefore, where a user opts to have the home controller device 102 automatically perform identification and resolution of vulnerabilities on a periodic basis, additional rewards points can be allocated or assigned to the user as a function of the number of times that successful identification and resolution of disparate vulnerabilities is performed on the selected internet of things device 106.

Gaming engine 1102 can also provide a facility that allows a user to find out who is using their internal network at any given time or within a defined period of time (e.g., last ten minutes, last hour, last twelve hours, last twenty four hours, last week, within the last fortnight, etc.). In this instance, gaming engine 1102, in collaboration with facilities and functionalities supplied by home controller device 102, can query, databases of log files maintained by home controller device 102 to identify suspicious activity by unauthorized people. Where unauthorized persons are illicitly using an internet of things device 106 access to the device can be curtailed and/or blocked. Once again reward points can be allocated or assigned to the user for having performed such actions.

Gaming engine 1102 can also provide functionalities associated with displaying data transmission/usage spikes that can have occurred within a defined time period. This facility allows users to identify internet of things devices that can have become infected with malware and/or that have started to send out inordinate amounts of data traffic. In accordance with this aspect, gaming engine 1102, in conjunction with facilities and functionalities provided by home controller device 102 (e.g., traffic log files individuated based on internet of things device, data usage log files individuated based on internet of things device, etc.), can display data transmission spikes and/or data usage spikes that can have occurred for particular internet of things device. In accordance with an aspect, the user while viewing an internet of things device through, for example, a virtual reality gaming helmet, can perceive the device as being color coded. For example, the internet of things device can be shaded red to indicate that the device appears to have had an inordinate level of data transmission activity and/or data usage over a defined or definable period of time; and can be shaded green to indicate that the device appears not to be experiencing an untoward level of data transmission activity and/or data usage within the defined or definable duration of time. In instances where a particular internet of things devices is shaded red (or in various deeper or darker shades of red indicating a more serious deviation from a baseline data transmission activity or a baseline data usage), the user can be prompted to take one or more physical actions (e.g., resetting the device by powering down the device, disconnecting the device from the network, executing vulnerabilities scans, checking open ports, . . . ) and thereafter addressing the root cause of the data transmission spikes and/or the data usage spikes. Once again when the issues have satisfactorily been resolved, gaming points can be awarded.

Home controller device 102 can be provided a periodic (e.g., daily) updated feed about recent blacklists in botnets (e.g., a grouping of Internet-connected devices, each of which is running one or more software applications that execute automated tasks over the Internet) and vulnerability releases. Accordingly, gaming engine 1102 in conjunction with home controller device 102 can notify users (e.g., through the virtual reality gaming device 104) as to whether or not internet of things devices within their home and/or office environments are on the blacklist or the vulnerability lists. The user in response to such notification can search for and move into proximity of devices that have entries in the blacklist or the vulnerability lists and thereafter take action to resolve the vulnerability issues noted in the blacklists and/or vulnerability lists. When the user addresses issues satisfactorily, gaming points can be awarded.

Figure 12:
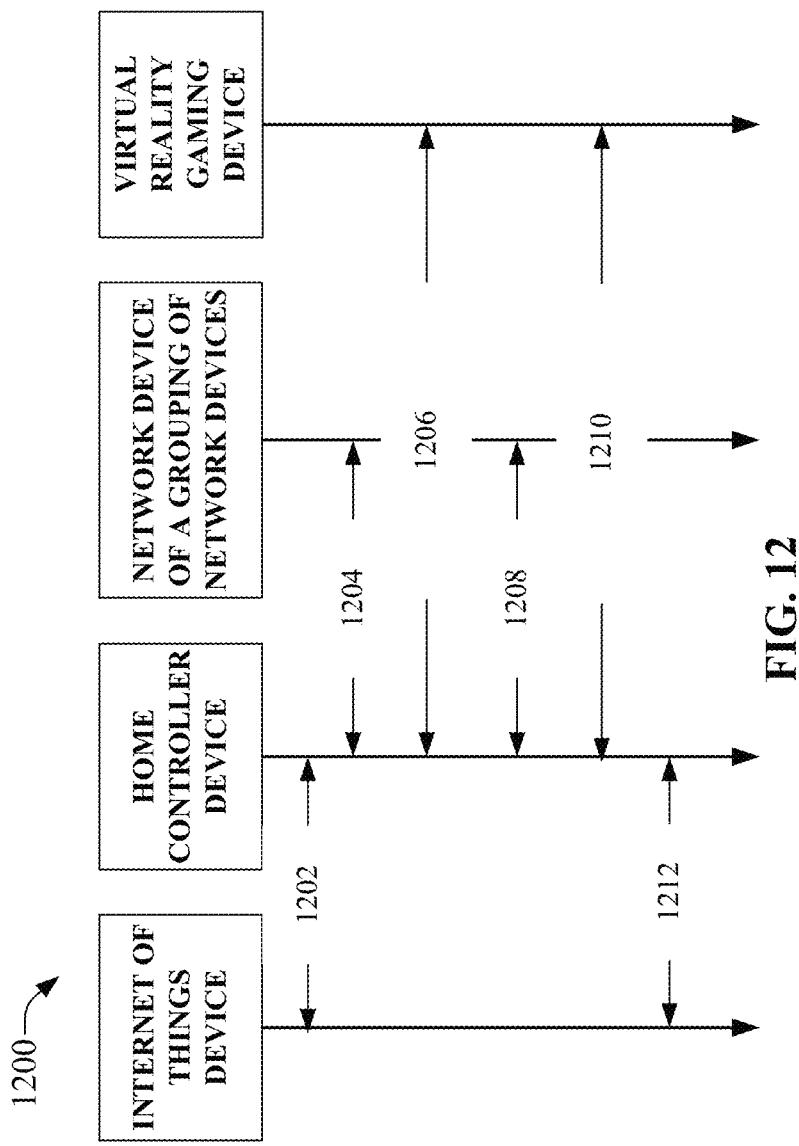
FIG. 12 provides illustration of a flow or method for augmenting security features associated with devices, located in home and/or office environments, connected to the internet of things via use of virtual reality devices, facilities, and/or functionalities, in accordance with aspects of the subject disclosure.

In view of the example system(s) described above, example method(s) that can be implemented in accordance with the disclosed subject matter can be better appreciated with reference to flowchart in FIG. 12. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

FIG. 12 illustrates a flow, method, or timing chart 1200 for augmenting security features associated with devices, located in home and/or office environments, connected to the internet of things via use of virtual reality devices, facilities, and/or functionalities, in accordance with aspects of the subject disclosure. Flow, method, or timing chart 1200 can commence at 1202 whereupon a home controller device can send out messaging over wired and/or wireless communication mediums for each internet of things device within a bounded area (e.g., home environment or business environment) to return data representative of pertinent information associated with the internet of things device. Further, at 1202 the home controller device can generate a unique identifier that can be associated with the returned data. Additionally, at 1202 the home controller device can store the unique identifier that has been associated with the return data to a database tuple of a database of database tuples. The database of database tuples can be persisted to a storage device, for instance. At 1204 the home controller device can retrieve, from one or more cloud facility devices, up-to-date security information data representing one or more vulnerabilities associated with the internet of things device, blacklists or white lists associated to with the one or more internet of things device, malware alerts and/or virus notifications that can be deleterious to the proper functioning of the one or more internet of things device, and the like. At 1206 the home controller device can facilitate display of a message on a virtual reality gaming device that indicates to the user that the internet of things device has been identified as having one or more identified or identifiable vulnerability that requires resolution. At 1208 home controller device can communicate with one or more cloud facility devices to obtain data necessary to remedy the identified or identifiable vulnerabilities. Such data can include firmware upgrades, software upgrades, operating system upgrades, remedial software necessary to patch the software and/or hardware vulnerabilities, and the like. Additionally, the data can also include instructional information necessary to guide the user through installation and implementation of the firmware upgrades, software upgrades, operating system upgrades, remedial software necessary the patch the identified software and/or hardware vulnerabilities. At 1210 home controller device can provide instructions to the user, via a display associated with the virtual reality gaming device, on how the user can take actions to remedy the identified vulnerabilities, such as implementing the firmware upgrades, software upgrades, operating system upgrades, remedial software, etc. At 1212 home controller device can update local databases (e.g., database tuples of the database of database tuples) with any relevant data indicating that the internet of things devices have been upgraded and identified vulnerabilities remedied and resolved. At 1212 home controller device can also award or allocate reward points to the user. The reward points can be points that reward the user for augmenting security features associated with internet of things devices. As has been noted earlier, the rewards can take the form of coupons, rebates, discounts, reward points, monetary rewards, and the like, that the user (or the user's gaming avatar) can redeem and use in gaming environments while using a virtual reality gaming device.

Figure 13:
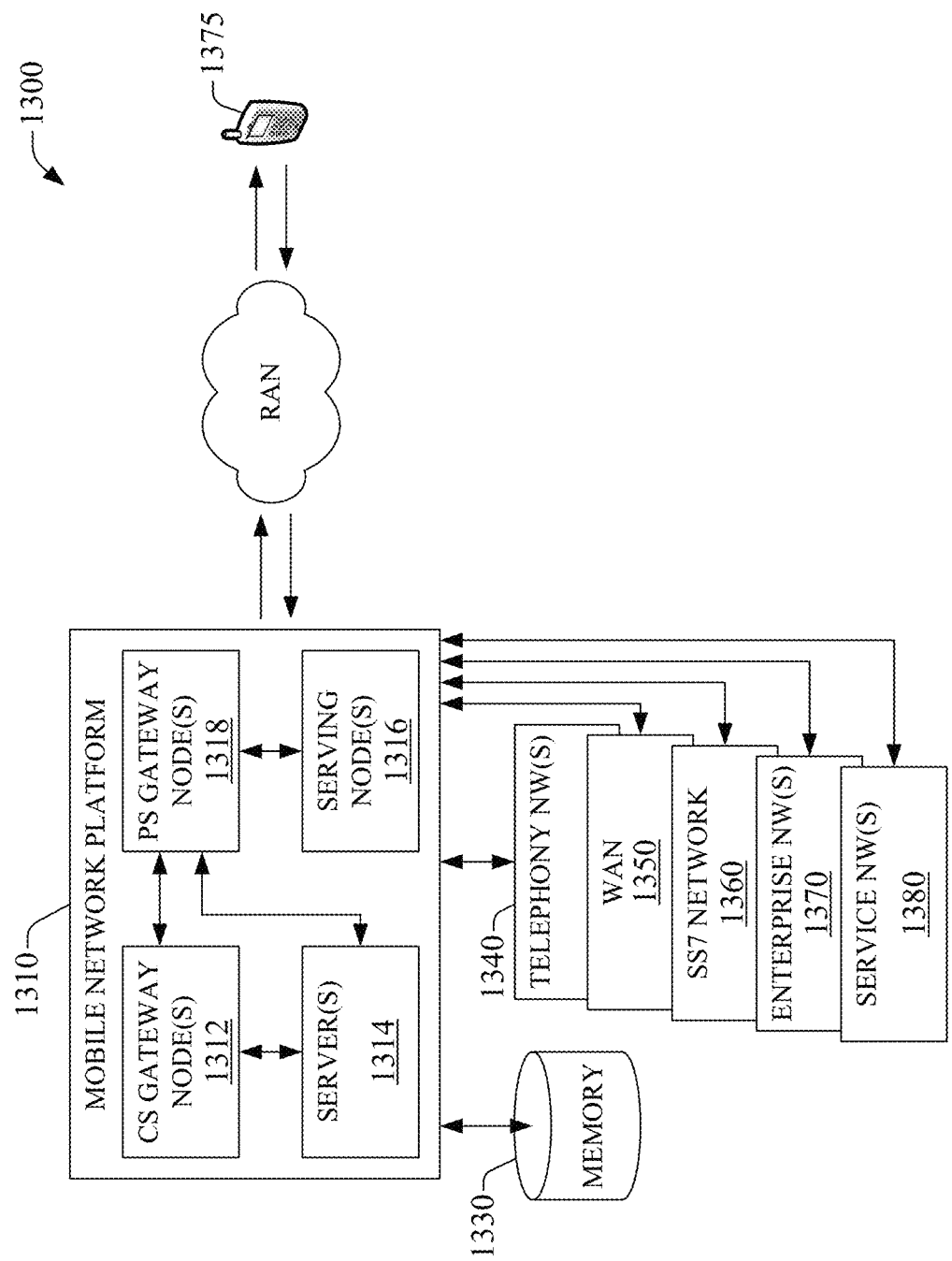
FIG. 13 is a block diagram of an example embodiment of a mobile network platform to implement and exploit various features or aspects of the subject disclosure.

FIG. 13 presents an example embodiment 1300 of a mobile network platform 1310 that can implement and exploit one or more aspects of the disclosed subject matter described herein. Generally, wireless network platform 1310 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1310 can be included in telecommunications carrier networks, and can be considered carrier-side components as discussed elsewhere herein. Mobile network platform 1310 includes CS gateway node(s) 1312 which can interface CS traffic received from legacy networks like telephony network(s) 1340 (e.g., public switched telephone network (PSTN), or public land mobile network (PLMN)) or a signaling system #7 (SS7) network 1370. Circuit switched gateway node(s) 1312 can authorize and authenticate traffic (e.g., voice) arising from such networks. Additionally, CS gateway node(s) 1312 can access mobility, or roaming, data generated through SS7 network 1370; for instance, mobility data stored in a visited location register (VLR), which can reside in memory 1330. Moreover, CS gateway node(s) 1312 interfaces CS-based traffic and signaling and PS gateway node(s) 1318. As an example, in a 3GPP UMTS network, CS gateway node(s) 1312 can be realized at least in part in gateway GPRS support node(s) (GGSN). It should be appreciated that functionality and specific operation of CS gateway node(s) 1312, PS gateway node(s) 1318, and serving node(s) 1316, is provided and dictated by radio technology(ies) utilized by mobile network platform 1310 for telecommunication.

In addition to receiving and processing CS-switched traffic and signaling, PS gateway node(s) 1318 can authorize and authenticate PS-based data sessions with served mobile devices. Data sessions can include traffic, or content(s), exchanged with networks external to the wireless network platform 1310, like wide area network(s) (WANs) 1350, enterprise network(s) 1370, and service network(s) 1380, which can be embodied in local area network(s) (LANs), can also be interfaced with mobile network platform 1310 through PS gateway node(s) 1318. It is to be noted that WANs 1350 and enterprise network(s) 1360 can embody, at least in part, a service network(s) like IP multimedia subsystem (IMS). Based on radio technology layer(s) available in technology resource(s) 1317, packet-switched gateway node(s) 1318 can generate packet data protocol contexts when a data session is established; other data structures that facilitate routing of packetized data also can be generated. To that end, in an aspect, PS gateway node(s) 1318 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1300, wireless network platform 1310 also includes serving node(s) 1316 that, based upon available radio technology layer(s) within technology resource(s) 1317, convey the various packetized flows of data streams received through PS gateway node(s) 1318. It is to be noted that for technology resource(s) 1317 that rely primarily on CS communication, server node(s) can deliver traffic without reliance on PS gateway node(s) 1318; for example, server node(s) can embody at least in part a mobile switching center. As an example, in a 3GPP UMTS network, serving node(s) 1316 can be embodied in serving GPRS support node(s) (SGSN).

For radio technologies that exploit packetized communication, server(s) 1314 in wireless network platform 1310 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1310. Data streams (e.g., content(s) that are part of a voice call or data session) can be conveyed to PS gateway node(s) 1318 for authorization/authentication and initiation of a data session, and to serving node(s) 1316 for communication thereafter. In addition to application server, server(s) 1314 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1310 to ensure network's operation and data integrity in addition to authorization and authentication procedures that CS gateway node(s) 1312 and PS gateway node(s) 1318 can enact. Moreover, provisioning server(s) can provision services from external network(s) like networks operated by a disparate service provider; for instance, WAN 1350 or Global Positioning System (GPS) network(s) (not shown). Provisioning server(s) can also provision coverage through networks associated to wireless network platform 1310 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1375.

It is to be noted that server(s) 1314 can include one or more processors configured to confer at least in part the functionality of macro network platform 1310. To that end, the one or more processor can execute code instructions stored in memory 1330, for example. It is should be appreciated that server(s) 1314 can include a content manager 1315, which operates in substantially the same manner as described hereinbefore.

In example embodiment 1300, memory 1330 can store information related to operation of wireless network platform 1310. Other operational information can include provisioning information of mobile devices served through wireless platform network 1310, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1330 can also store information from at least one of telephony network(s) 1340, WAN 1350, enterprise network(s) 1360, or SS7 network 1370. In an aspect, memory 1330 can be, for example, accessed as part of a data store component or as a remotely connected memory store.

Figure 14:
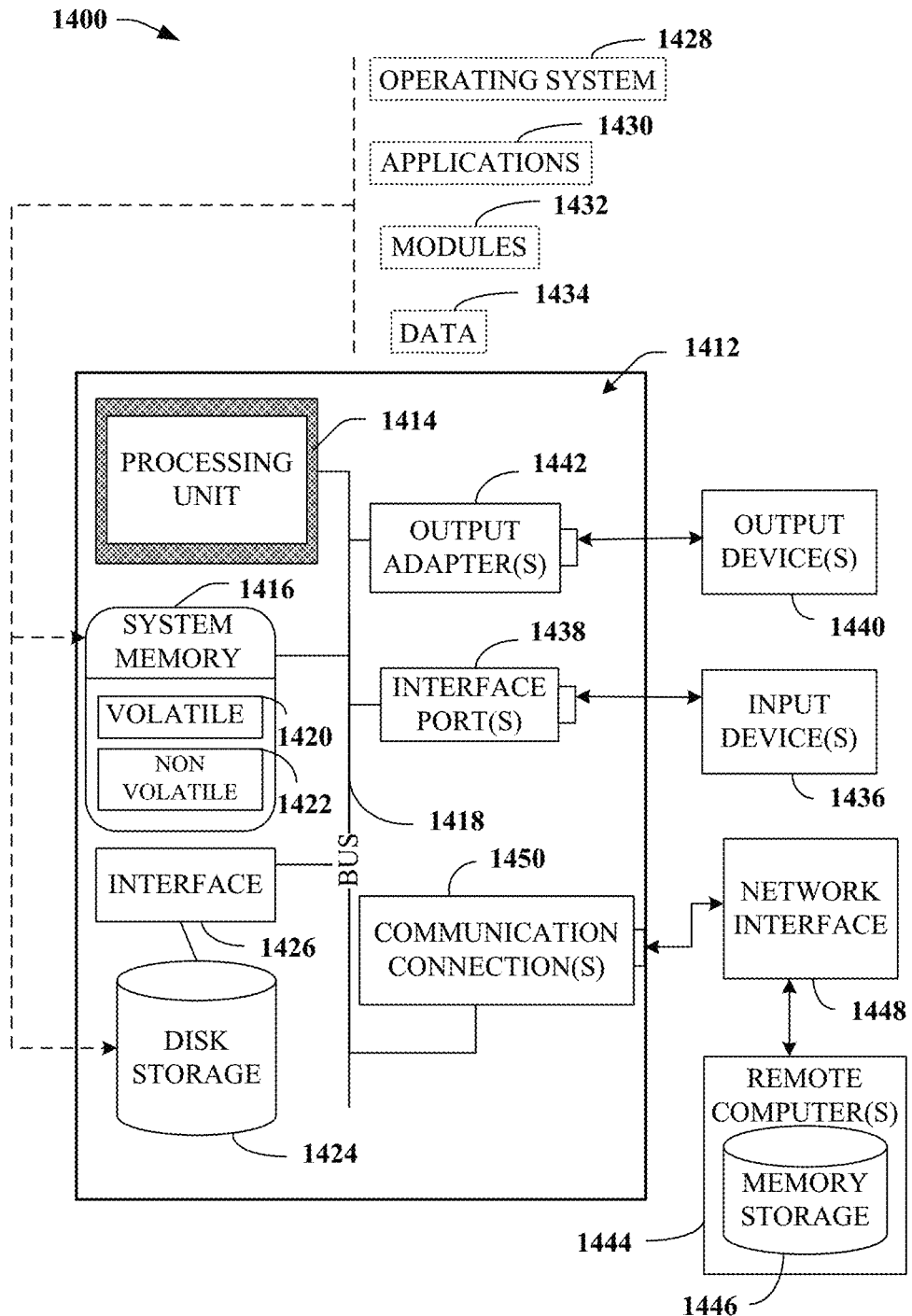
FIG. 14 illustrates a block diagram of a computing system operable to execute the disclosed systems and methods in accordance with an embodiment.

In order to provide a context for the various aspects of the disclosed subject matter, FIG. 14, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1420 (see below), non-volatile memory 1422 (see below), disk storage 1424 (see below), and memory storage 1446 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 14 illustrates a block diagram of a computing system 1400 operable to execute the disclosed systems and methods in accordance with an embodiment. Computer 1412, which can be, for example, part of the hardware of system 140, includes a processing unit 1414, a system memory 1416, and a system bus 1418. System bus 1418 couples system components including, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1416 can include volatile memory 1420 and nonvolatile memory 1422. A basic input/output system (BIOS), containing routines to transfer information between elements within computer 1412, such as during start-up, can be stored in nonvolatile memory 1422. By way of illustration, and not limitation, nonvolatile memory 1422 can include ROM, PROM, EPROM, EEPROM, or flash memory. Volatile memory 1420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 can also include removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 14 describes software that acts as an intermediary between users and computer resources described in suitable operating environment 1400. Such software includes an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be noted that the disclosed subject matter can be implemented with various operating systems or combinations of operating systems.

A user can enter commands or information into computer 1412 through input device(s) 1436. As an example, mobile device and/or portable device can include a user interface embodied in a touch sensitive display panel allowing a user to interact with computer 1412. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smart phone, tablet computer, etc. These and other input devices connect to processing unit 1414 through system bus 1418 by way of interface port(s) 1438. Interface port(s) 1438 include, for example, a serial port, a parallel port, a game port, a universal serial bus (USB), an infrared port, a Bluetooth port, an IP port, or a logical port associated with a wireless service, etc. Output device(s) 1440 use some of the same type of ports as input device(s) 1436.

Thus, for example, a USB port can be used to provide input to computer 1412 and to output information from computer 1412 to an output device 1440. Output adapter 1442 is provided to illustrate that there are some output devices 1440 like monitors, speakers, and printers, among other output devices 1440, which use special adapters. Output adapters 1442 include, by way of illustration and not limitation, video and sound cards that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, cloud storage, cloud service, a workstation, a microprocessor based appliance, a peer device, or other common network node and the like, and typically includes many or all of the elements described relative to computer 1412.

For purposes of brevity, only a memory storage device 1446 is illustrated with remote computer(s) 1444. Remote computer(s) 1444 is logically connected to computer 1412 through a network interface 1448 and then physically connected by way of communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory"

or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
based on received data, generating vulnerability data representative of a vulnerability associated with first equipment, wherein the received data was received in response to messaging data being broadcast to a group of equipment that comprises the first equipment;
based on the vulnerability data, determining rectification data that remedies the vulnerability; and
instructing a download of the rectification data to be sent to the first equipment,
wherein the received data is associated with an identifier generated using a multiparty block chain process comprising encrypting media access control data, associated with the first equipment, with a first encryption key associated with the first equipment, a second encryption key associated with second equipment, and a third encryption key associated with third equipment, wherein the received data is representative of attribute data associated with the first equipment, and wherein the identifier is used as a head entry of a linked list representative of the attribute data.

2. The system of claim 1, wherein the identifier is a unique identifier associated with the first equipment.

3. The system of claim 2, wherein the unique identifier is generated as a function of the media access control data associated with the first equipment and a pseudorandom number generator that uses the media access control data as an input to generate the unique identifier.

4. The system of claim 1, wherein the received data is first data, and wherein the first data is used to obtain, from a group of database equipment, second data representing the rectification data used to configure the first equipment.

5. The system of claim 4, wherein the second data comprises identification data representing the vulnerability data.

6. The system of claim 4, wherein the second data comprises firmware patch data used to configure the first equipment.

7. The system of claim 4, wherein the second data comprises software patch data used to configure software in execution on the first equipment.

8. The system of claim 1, wherein the first equipment is internet of things equipment.

9. The system of claim 1, wherein the operations further comprise instructing that the vulnerability data be rendered via a display associated with a virtual reality helmet device.

10. A method, comprising:
determining, by a system comprising a processor, that a user equipment has initiated a communication session with a first device, wherein the communication session between the user equipment and the first device is initiated in response to receiving, by the system, a response to broadcast messaging data transmitted to a grouping of equipment that comprises the first device;
facilitating, by the system, downloading resolution data representing a resolution of a vulnerability determined, based on vulnerability data, to exist with the first device; and
facilitating, by the system, reconfiguring the first device based on the resolution data,
wherein the vulnerability data is generated based on data received from the first device, and wherein the data is associated with an identifier generated using a multiparty block chain process comprising encrypting an attribute, associated with the first device, with a first encryption key associated with the first device, a second encryption key associated with a second device, and a third encryption key associated with the user equipment, wherein the data received from the first device represents attribute data associated with the first device, and wherein the identifier is used as a head entry of a linked list representing the attribute data.

11. The method of claim 10, further comprising generating, by the system, a unique identifier associated with the first device.

12. The method of claim 11, wherein the unique identifier is generated using the attribute representative of the first device and that is included in the data associated with the first device.

13. The method of claim 10, wherein the data is first data, and wherein the first data is used to retrieve, from a data store, second data representing the resolution data.

14. The method of claim 13, wherein the second data comprises firmware patch data used to reconfigure the first device.

15. The method of claim 14, wherein the second data further comprises instructional data that provides a direction on implementing the firmware patch data to reconfigure the first device.

16. The method of claim 10, wherein the user equipment comprises virtual reality gaming equipment, and wherein the vulnerability data is formatted for display to the display associated with the virtual reality gaming equipment.

17. A non-transitory machine-readable medium, comprising executable instructions that, when executed by a processor, facilitate performance of operations, comprising:
transmitting messaging data to a device of a grouping of devices;
in response to receiving a response to the messaging data, determining that a user equipment is in communication with the device;
downloading resolution data comprising reconfiguration guidance data to the device based on an identified malware vulnerability associated with the device;
displaying the reconfiguration guidance data via a display associated with the user equipment; and
reconfiguring the device based on the resolution data,
wherein the downloading comprises downloading the resolution data based on data associated with the device, and wherein the data is encrypted using a multi-party block chaining process comprising encrypting attribute data, associated with the device, the encrypting using a first encryption key associated with the device, a second encryption key associated with the user equipment, and a third encryption key associated with network equipment, and wherein the encrypting generates an identifier that is used as a head entry of a linked list representing the attribute data.

18. The non-transitory machine-readable medium of claim 17, wherein the operations further comprise obtaining the resolution data from the network equipment based on the data.

19. The non-transitory machine-readable medium of claim 18, wherein the operations further comprise applying software patch data included in the resolution data to reconfigure the device.

20. The non-transitory machine-readable medium of claim 19, wherein the user equipment is a virtual reality helmet device, wherein the operations further comprise displaying formatted instruction data associated with the software patch data via the display associated with the virtual reality helmet device, and wherein the formatted instruction data comprises guidance information for installation of the software patch data.

* * * * *